Dec. 25, 1951 K. T. ORRISON Re. 23,446

ICE PRODUCT AND METHOD OF MAKING THE SAME

Original Filed April 14, 1938 2 SHEETS—SHEET 1

INVENTOR.
Kelvin T. Orrison
BY John Boyle
ATTORNEY.

Dec. 25, 1951 K. T. ORRISON Re. 23,446

ICE PRODUCT AND METHOD OF MAKING THE SAME

Original Filed April 14, 1938 2 SHEETS--SHEET 2

INVENTOR.
Kelvin T. Orrison,
BY John Boyle
ATTORNEY.

Reissued Dec. 25, 1951

Re. 23,446

UNITED STATES PATENT OFFICE 23,446

ICE PRODUCT AND METHOD OF MAKING THE SAME

Kelvin T. Orrison, Washington, D. C., assignor of two-eighths to John Boyle, Jr., and three-eighths to Frank G. Jennings, both of Washington, D. C.

Original No. 2,118,796, dated May 24, 1938, Serial No. 202,075, April 14, 1938. Application for reissue August 10, 1951, Serial No. 241,274

6 Claims. (Cl. 62—1)

Matter enclosed in heavy brackets [ ] appears in the original patent but forms no part of this reissue specification; matter printed in italics indicates the additions made by reissue.

My invention relates to a new ice product, especially adapted for use in beverages, and to a process for producing such a product. Heretofore, in adding ice to beverages, it has been either in the form of ice cubes or crushed ice. Ordinary crushed ice, resulting from crushing a block of ice, is a mixture of pieces of ice of various sizes including, what is referred to in the trade as "snow." Snow, which is the finest part of the ice, is formed by the shavings from the crushing operation and also by crushing the cloudy part of the block of ice. Snow is objectionable because it melts too fast and packs together readily. Other pieces of ordinary crushed ice may be too large in size for convenient use in a drinking glass.

One of the objects of my invention is to provide a commercially feasible supply of crushed, graded ice in a readily available package form for dispensing by drug-stores, ice cream parlors, hotels, restaurants and the like.

Another object is to produce as a new product, clean discrete free-flowing sparkling crystal clear lumps of ice free from snow and preferably of predetermined graded sizes.

A further object is a process for making such a product in a cheap and practical manner.

With these and other objects in view, my invention consists in certain novel features as will be hereinafter more fully described and pointed out in the appended claims.

In making my new product, I produce a large block of ice in a can and as the block finishes freezing, I remove the liquid core and supply fresh clear water thereto, all as in the customary commercial manner, thereby eliminating the cloudy core that would otherwise form. When there is cloudy ice on the top part of the block, this is *preferably* sawed off so that the resultant block is substantially all solid transparent ice. This block of ice is then put through an ice crusher and screened to predetermined grades or sizes. Usually, I produce three grades: rice, pea and chestnut, comparable to the same grades that are found in anthracite coal. The oversize pieces from the first screen can be recrushed but the snow is otherwise disposed of, as ice in such form is not suitable for my purposes because it melts too quickly in handling and in the beverage.

The three grades of ice above specified are produced by screening the crushed ice through four successive vibrating screens having openings of about one and one-half inches, one inch, one-half an inch and one-quarter of an inch, respectively. The nut size passes through the one and one-half inch screen and collects on the one inch screen; the pea size passes through the one inch screen and collects on the half inch screen; the rice size passes through the one-half inch screen and collects on the one-quarter inch screen; and the snow is what passes through the quarter inch screen.

In carrying out the screening operation, I use any suitable type of vibrating screen. "Vibrating screen" is the well-known name that is applied in the art to distinguish that type of shaking screen that is characterized by a high frequency of vibration and a small amplitude.

By way of example, I have illustrated in the drawings a suitable type of vibrating screen that can be used, and in which:—

Figure 1:
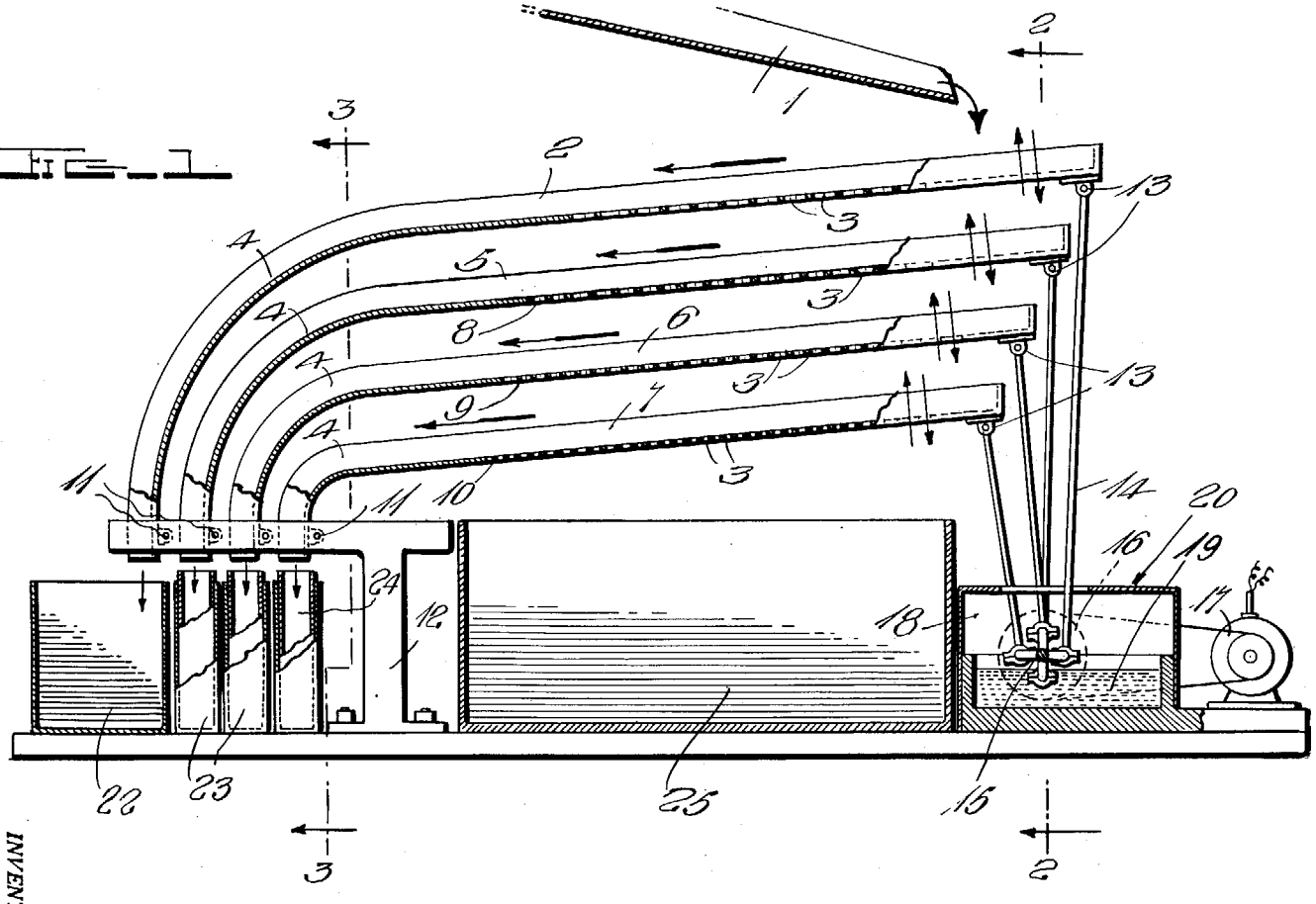
Figure 1 is a side elevation with certain parts broken away and other parts in vertical section.
Figure 2:
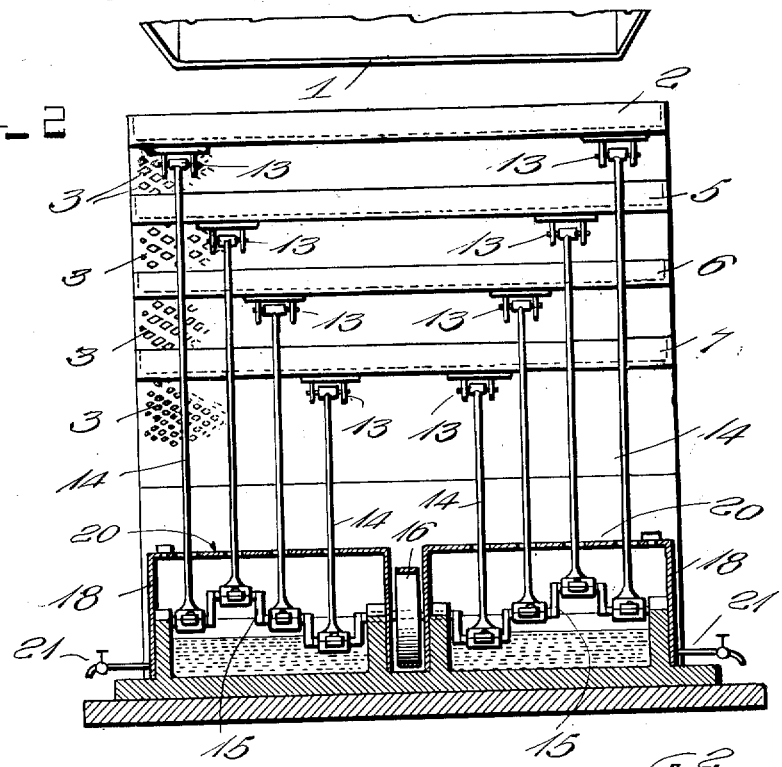
Figure 2 is a transverse vertical section on the line 2—2 of Figure 1.
Figure 3:
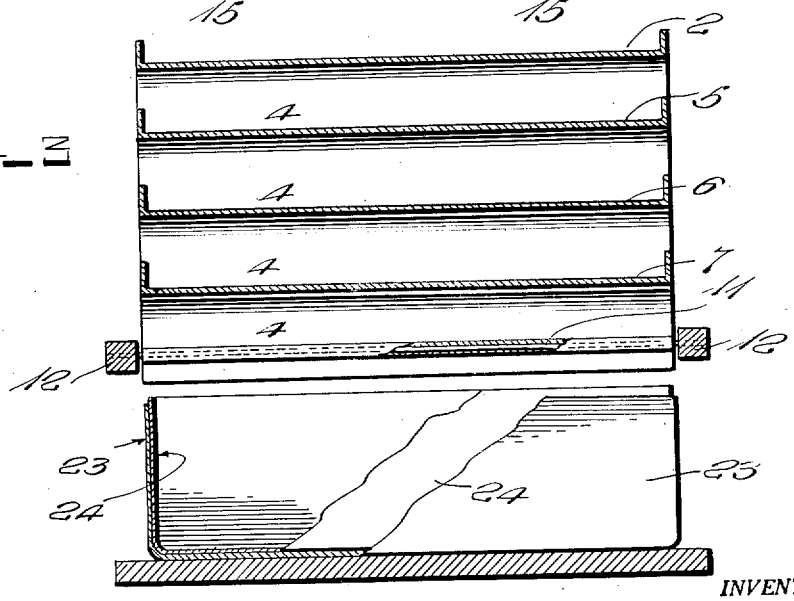
Figure 3 is a transverse vertical section on the line 3—3 of Figure 1, with a fragmentary detail section showing the pivot for the screen.

The ice from a crusher is delivered onto the chute 1 and discharges on to the elevated end of the vibrating screen 2 that is provided with apertures 3 for a portion of its length and a smooth curved portion 4 for the remainder of its length. The screens 5, 6 and 7 are of the same general construction, except that the apertured portions 3 are extended as at 8, 9 and 10, a little beyond the apertured portion of the overlying screen, so that as the sifted material drops from the overlying screen there will be some screening space to take care of all of it.

The front end of each screen is pivoted at 11 to a support 12 and at their upper ends are pivoted at 13 to the links 14, there being a pair of links 14 for each screen. At their lower ends, the links are pivoted to a crank shaft 15, the four cranks being set 90 degrees apart to minimize vibration of the machine and to provide a smooth motor load.

The crank shaft is driven by a pulley 16, belt connected to a standard 1750 R. P. M. electric motor 17, which is geared down so that the crank shaft 15 rotates at about 875 R. P. M., which is the periodicity of vibration of each one of the screens. The radius of the cranks is a half inch so that there is a rise and fall of an inch at the upper end of the screens. The screening surface 3 is about 5 to 6 feet long and the width of the screens is about 2 and ½ to 3 feet, the screens being at an inclination of 10–15 degrees with the horizontal. The crank case 18 is provided with an oil reservoir for the oil 19 and is also provided with a crank case cover 20 and a draw-off spigot 21.

At the discharge end of the upper screen 2 is a receptacle 22 for receiving the oversize ice which is returned to the crusher. At the discharge end of the other screens are the receptacles 23 which support cartons 24 or other suitable type of receptacles for receiving the graded ice. The top screen 2 will have the largest openings and the screens 5, 6 and 7 will have openings of diminishing size, as pointed out above.

Operation

The ice from the crusher which is a mixture of pieces of various sizes, usually not larger than three or four inches, and including snow, is fed to the upper end of the top screen. As the screen vibrates at the high frequency, the pieces of ice thereon are in a seething state of agitation and are shaken and rubbed against each other and against the surface of the screen. This causes any snow or dirt that is adhering to the pieces of ice or in the mass to be separated therefrom and pass through the openings in the screen, leaving the clean discrete pieces of ice free from snow on the screen. Freshly crushed ice has many sharp knife edges and the vibrating screening motion causes some rounding or dulling by abrasion of these sharp edges. The vibrating motion also will split some of the pieces that may have snow in them along this line of weakness and this snow will thereupon be shaken out of the mass. The possible range in the periodicity and amplitude of vibration is a matter of adjustment in securing a product having the desired characteristics.

The ice product on the different screens will be entirely free of the small pieces of ice known as snow, so that they are clean, free flowing and do not stick together. The discrete lumps are sparkling and crystal clear. The freshly crushed, screened and graded pieces of ice have much the same general surface contour and shape as crushed and graded anthracite of similar grades. The pieces of freshly crushed and screened ice are solid transparent lumps of irregular shape, the fractured surfaces of which are uneven, the edges of the pieces being generally somewhat rounded or dull.

With the idea of keeping the ice as discrete and non-adhering pieces until disposed of to the consumer, it is crushed and graded in a room, the temperature of which is kept below the melting point of ice and thereupon, in one form, is packed in paper cartons, similar to those used for retailing ice cream; or in any other kind of a suitable container. When the ice is to be sold to hotels, restaurants and the like, it can be packed and delivered in large canvas bags or other containers similar to those now used for ungraded crushed ice. From the time of crushing until delivered to the ultimate consumer, the ice should be kept preferably at all times below the melting point. On delivery, it can be kept in refrigerators. This precaution is desirable so that the pieces of ice will not melt and later freeze together. This assures that the graded pieces of ice will not stick together but will be free flowing discrete lumps, like hard coal of similar grades. While it is desirable to keep the graded ice, so far as possible below the melting point, it can be kept above the melting point for some considerable period of time without seriously affecting the product. *That is, this ice product may be held in an atmosphere that is at or above freezing, in packages or otherwise, for considerable periods, often until the ice has entirely melted, without regelation.* This is especially true with respect to the larger sizes. When the graded ice is in a package and begins to melt, the water drips to the bottom of the package and if this is again frozen, the pieces in the bottom of the package will freeze together. When the graded pieces are mixed with snow, melting and deterioration of the product will occur much more quickly.

Since the graded ice is to be used principally in beverages, the largest size cannot be any larger than what can be used conveniently in the ordinary drinking glass. The largest of the sizes will be used where it is desired that the ice shall melt gradually. The smallest size such as the rice will be used where it is desirable to chill the beverage quickly. This size can be used also for chilling beverages in the bottle by packing the bottle therein. *The term "free-flowing" used in this patent refers to an ice product that will not regelate for some considerable period of time when held in an atmosphere that is either below, or above freezing.*

This application is a continuation-in-part of my application filed January 31, 1938, Serial No. 188,015, *now abandoned.*

What I claim is:—

1. As an article of manufacture, a free-flowing mass of ice in bulk form produced by *freezing a body of water, removing water during the latter part of the freezing that would otherwise form into a cloudy core, adding fresh water to replace that removed and finishing the freezing,* crushing *the* ice into lumps and then screening to produce discrete *solid transparent* pieces free from snow, *the screening being one which places the ice lumps in a seething state of agitation which shakes the lumps and rubs them against each other and against the surface of the screen causing any snow that is adhering to the pieces of ice to be separated therefrom,* the sharp edges of the pieces produced by crushing being rounded by abrasion from the screening motion.

[2. As a product of manufacture, a mass of free-flowing clean discrete lumps of crushed ice in bulk form, of uniform grade as to size, the shape of the lumps being irregular and generally characterized by a fractured surface contour that is uneven.]

[3. As a product of manufacture, a mass of free-flowing, clean discrete transparent lumps of crushed ice in bulk form, of uniform grade as to size, the shape of the lumps being irregular and generally characterized by a fractured surface contour that is uneven.]

[4. A package of free-flowing clean discrete lumps of ice, substantially uniform in size, the shape of the lumps being irregular and generally characterized by a fractured surface contour that is uneven, the contents of the package being free from snow and the lumps being non-adherent.]

[5. A package of free-flowing clean discrete transparent lumps of ice, substantially uniform in size, the shape of the lumps being irregular and generally characterized by a fractured surface contour that is uneven, the contents of the package being free from snow and the lumps being non-adherent.]

[6. The method of making a free-flowing mass of ice comprising crushing a block of ice thereby producing a mixture of pieces of ice of various sizes including snow, subjecting the mixture to a vibrating screening motion of high frequency and low amplitude to separate the mixture into one portion that contains the snow and into another portion that consists of free-flowing discrete lumps free from snow.]

7. The method of making a free-flowing mass of ice comprising crushing a *transparent* block of ice thereby producing a mixture of pieces of ice of various sizes including snow, subjecting the mixture to *a seething state of agitation through* a vibrating screening motion of high frequency and low amplitude to separate the mixture into one portion that contains the snow and into another portion that consists of free-flowing *crystal clear discrete* lumps free from snow, and carrying out the screening operation at a temperature where there will be no substantial melting of the ice.

[8. The method of making a free-flowing mass of graded ice of predetermined size comprising crushing a block of ice thereby producing a mixture of pieces of ice of various sizes including snow, subjecting the mixture to a vibrating screening motion of high frequency and low amplitude to separate the mixture into one portion that contains the snow and into another portion that consists of free-flowing discrete lumps free from snow, and subjecting the portion containing the snow to a further vibrating screening motion to produce a second portion containing snow and a portion that consists of free-flowing discrete lumps free from snow and smaller in size than the first-mentioned lumps.]

[9. The method of making a free-flowing mass of graded ice of predetermined size comprising crushing a block of ice thereby producing a mixture of pieces of ice of various sizes including snow, subjecting the mixture to a vibrating screening motion of high frequency and low amplitude to separate the mixture into one portion that contains the snow and into another portion that consists of free-flowing discrete lumps free from snow and subjecting the portion containing the snow to a further vibrating screening motion to produce a second portion containing snow and a portion that consists of free-flowing discrete lumps free from snow and smaller in size than the first-mentioned lumps, and carrying out the screening operation at a temperature below the melting point of ice.]

*10. The method of claim 7 in which the transparent block is produced by freezing a body of water and during the latter part of the freezing removing water that would otherwise form into a cloudy core, replacing the water with fresh water and finishing the freezing of the block.*

*11. The method of claim 10 in which any cloudy ice on the top part of the block is sawed off before crushing so that the resultant block fed to the crusher is all transparent ice.*

*12. The method of claim 1 in which any cloudy ice at an end of the block is sawed off so that the block is all transparent before it is crushed.*

*13. As an article of manufacture, a free-flowing mass of ice in bulk form produced by crushing transparent ice into lumps and then screening to produce discrete solid transparent pieces free from snow, the screening being one which places the ice lumps into a seething state of agitation which shakes the lumps and rubs them against each other and against the surface of the screen causing any snow that is adhering to the pieces of ice to be separated therefrom, the sharp edges of the pieces produced by crushing being rounded by abrasion from the screening motion.*

KELVIN T. ORRISON.

REFERENCES CITED

The following references are of record in the file of this patent:

UNITED STATES PATENTS

| Number | Name | Date |
|---|---|---|
| 772,860 | Bemis | Oct. 18, 1904 |
| 850,607 | Shroder | Apr. 16, 1907 |
| 1,442,193 | Taylor | Jan. 16, 1923 |
| 1,724,007 | Crabb | Aug. 13, 1929 |
| 1,730,923 | Field | Oct. 8, 1929 |
| 1,768,642 | Summers | July 1, 1930 |
| 1,982,842 | Taylor | Dec. 4, 1934 |
| 2,005,736 | Field | June 25, 1935 |
| 2,014,245 | Donahoe | Sept. 10, 1935 |
| 2,082,665 | Uline | June 1, 1937 |

FOREIGN PATENTS

| Number | Country | Date |
|---|---|---|
| 14,577 | Great Britain | 1901 |
| 686,451 | France | Apr. 14, 1930 |

(All references above cited from abandoned application No. 188,015. No other references relied upon.)